US008741816B2

(12) United States Patent
Livanec et al.

(10) Patent No.: US 8,741,816 B2
(45) Date of Patent: *Jun. 3, 2014

(54) COMPOSITIONS AND METHODS FOR TREATMENT OF WELL BORE TAR

(75) Inventors: Philip Wayne Livanec, Deer Park, TX (US); Greg Paul Perez, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 231 days.

This patent is subject to a terminal disclaimer.

(21) Appl. No.: 13/368,639

(22) Filed: Feb. 8, 2012

(65) Prior Publication Data
US 2012/0132423 A1 May 31, 2012

Related U.S. Application Data

(60) Continuation of application No. 12/630,502, filed on Dec. 3, 2009, now Pat. No. 8,603,951, which is a division of application No. 11/873,257, filed on Oct. 16, 2007, now Pat. No. 7,665,523.

(51) Int. Cl.
C09K 8/12 (2006.01)
C09K 8/52 (2006.01)
C09K 8/528 (2006.01)

(52) U.S. Cl.
USPC ............ 507/119; 507/90; 507/224; 507/927; 507/929; 507/930; 507/937

(58) Field of Classification Search
CPC ...... C09K 8/52; C09K 8/524; Y10S 507/927; Y10S 507/929; Y10S 507/93; Y10S 507/931
USPC ......... 507/927, 929, 930, 931, 224, 100, 119, 507/90
See application file for complete search history.

(56) References Cited

U.S. PATENT DOCUMENTS

| 2,650,905 | A | * | 9/1953 | Fordyce et al. ............... 507/122 |
| 2,718,497 | A | * | 9/1955 | Oldham et al. ................ 175/65 |
| 3,960,214 | A | | 6/1976 | Striegler et al. |
| 4,103,074 | A | | 7/1978 | Hertel et al. |
| 4,797,450 | A | | 1/1989 | Dehm et al. |
| 4,812,327 | A | | 3/1989 | Hanazawa et al. |
| H0000837 | H | | 11/1990 | Peiffer et al. |
| 5,032,295 | A | | 7/1991 | Matz et al. |
| 5,658,577 | A | | 8/1997 | Fowler et al. |
| 5,866,517 | A | | 2/1999 | Carpenter et al. |
| 6,104,224 | A | | 8/2000 | Koshikawa |
| 6,564,869 | B2 | | 5/2003 | McKenzie et al. |
| 6,715,568 | B1 | * | 4/2004 | Bailey ............................ 175/72 |
| 7,081,438 | B2 | | 7/2006 | Horton |
| 7,278,485 | B2 | | 10/2007 | Kirsner et al. |
| 7,332,458 | B2 | | 2/2008 | Baltoiu et al. |
| 7,665,523 | B2 | | 2/2010 | Perez |
| 8,603,951 | B2 | | 12/2013 | Perez |
| 2004/0129459 | A1 | | 7/2004 | Guichard et al. |
| 2004/0204324 | A1 | | 10/2004 | Baltoiu et al. |
| 2005/0037927 | A1 | | 2/2005 | Horton |
| 2006/0003899 | A1 | | 1/2006 | Levey et al. |
| 2006/0144594 | A1 | | 7/2006 | Perez |
| 2006/0148656 | A1 | | 7/2006 | Perez |
| 2007/0114036 | A1 | | 5/2007 | Perez |
| 2008/0214413 | A1 | | 9/2008 | Ewanek |
| 2009/0011960 | A1 | | 1/2009 | Wu |
| 2010/0081584 | A1 | | 4/2010 | Perez |
| 2010/0298173 | A1 | | 11/2010 | Smith et al. |
| 2011/0000400 | A1 | | 1/2011 | Roddy |

FOREIGN PATENT DOCUMENTS

| CA | 2451585 | | 6/2004 |
| CA | 2478622 | A1 * | 5/2005 |
| CA | 2481543 | | 3/2006 |
| EP | 0626397 | | 11/1994 |
| EP | 0837122 | A2 | 4/1998 |
| EP | 2071405 | A1 | 6/2009 |
| WO | 2004050791 | | 6/2004 |
| WO | 2004060790 | | 7/2004 |
| WO | WO 2007041841 | A1 * | 4/2007 |
| WO | 2011092491 | | 8/2011 |

OTHER PUBLICATIONS

MSDS datasheet of CIBA Alcomer 1771, 2005.*
Glossary of Basic Terms in Polymer Science, Pure& Applied Chemsitry., vol. 68, pp. 2287, 1996.*
MSDS datasheet of CIBA ALcomer 507, 2005.*
SIGMA-ALDRICH polyacrylic acid specification data sheet, downloaded from SIGMA-ALDRICH web site on Jan. 3, 2014.*
Thomson Scientific, London, GB; 1985-043467, XP002512517.
Thomson Scientific, London, GB, 1989-229547, XP002512518.
International Search Report and Written Opinion for PCT/GB2008/003405, dated Feb. 5, 2009.
Warren, et al., "Development and Field Results of a Unique Drilling Fluid Designed for Heavy Oil Sands Drilling," Society of Petroleum Engineers, SPE 92462, 1-9, Feb. 23-25, 2005.
Freeman, et al., "Novel Drilling Fluid Eliminates Tar Problems Associated With Drilling SAGD Wells," Society of Petroleum Engineers, SPE 90986, 1-5, Sep. 26-29, 2004.
USPTO Office Action for U.S. Appl. No. 11/873,257 dated May 21, 2009.
USPTO Notice of Allowability for U.S. Appl. No. 11/873,257 dated Nov. 17, 2009.
USPTO Office Action for U.S. Appl. No. 12/630,502 dated May 11, 2011.
USPTO Office Action for U.S. Appl. No. 12/630,502 dated Sep. 23, 2011.
Kostansek, "Emulsions" in Kirk-Othmer Encyclopedia of Chemical Technology 2003, vol. 10, p. 113-133.
MSDS datasheet of Plioway® ULTRA 200 from Eliokem.
Office Action from U.S. Appl. No. 13/555,624 dated Feb. 26, 2013.
Office Action from U.S. Appl. No. 12/630,502 dated Feb. 27, 2013.

(Continued)

Primary Examiner — Aiqun Li
(74) Attorney, Agent, or Firm — Craig W. Roddy; Tumey L.L.P.

(57) ABSTRACT

Of the many compositions and methods provided herein, one method includes a method comprising: contacting tar resident in a well bore with a tar stabilizing polymer comprising at least one polymer selected from the group consisting of a styrene polymer, an acrylate polymer, a styrene-acrylate polymer, and any combination thereof; and allowing the tar stabilizing polymer to interact with the tar to at least partially reduce the tendency of the tar to adhere to a surface.

35 Claims, No Drawings

(56) References Cited

OTHER PUBLICATIONS

International Search Report and Written Opinion of the International Searching Authority for PCT/US2013/025252 dated Jun. 13, 2013.
Office Action for U.S. Appl. No. 12/630,502 dated Jun. 27, 2013.
Advisory Action from USPTO for U.S. Appl. No. 12/630,502 dated Sep. 9, 2013.
USPTO Office Action for U.S. Appl. No. 13/555,624 dated Oct. 19, 2012.
USPTO Office Action for U.S. Appl. No. 12/630,502 dated May 17, 2012.
CETCO technical data sheet of Barite, 2011.
International Search Report and Written Opinion for Application No. PCT/US2013/064373 dated Dec. 23, 2013.

* cited by examiner

COMPOSITIONS AND METHODS FOR TREATMENT OF WELL BORE TAR

CROSS-REFERENCE TO RELATED APPLICATIONS

The present application is a continuation-in-part of U.S. patent application Ser. No. 12/630,502, entitled "Compositions and Methods for Treatment of Well Bore Tar," filed on Dec. 3, 2009, which is a divisional of U.S. patent application Ser. No. 11/873,257, entitled "Compositions and Methods for Treatment of Well Bore Tar," filed on Oct. 16, 2007, now U.S. Pat. No. 7,665,523, the entire disclosures of which are incorporated herein by reference.

BACKGROUND

The present invention relates to methods and compositions for use in subterranean operations. More particularly, the present invention relates to tar stabilizing polymers used to treat tar resident in a well bore and associated methods of use.

Many subterranean operations involve the drilling of a well bore from the surface through rock and/or soil to penetrate a subterranean formation containing fluids that are desirable for production. In the course of drilling operations and other subterranean operations, the drillstring and/or other equipment may come into contact with zones of rock and/or soil containing tar (e.g., heavy hydrocarbons, asphalt, and bitumens); in many such operations, it may be desirable to drill the well bore through these tar-containing zones. However, tar is a relatively tacky substance that may readily adhere to any surface that it contacts, including the surfaces of the well bore and/or any equipment utilized during the drilling operation. Tar also may dissolve into many synthetic treatment fluids used in the course of drilling operations, increasing the tacky and adhesive properties of the tar. If a sufficient amount of tar adheres to surfaces in the well bore or drilling equipment, it may, among other problems, prevent the drillstring from rotating, prevent fluid circulation, or otherwise impede the effectiveness of a drilling operation. In some cases, it may become necessary to remove and/or disassemble the drillstring in order to remove accretions of tar, a process which may create numerous cost and safety concerns. The accretion of tar on drilling equipment and/or in the well bore also can impede any subsequent operations downhole, including cementing, acidizing, fracturing, sand control, and remedial treatments. In addition, soft, tacky tar that manages to reach the surface may foul surface equipment, including solids screening equipment.

Existing methods of managing these problems that result from well bore tar incursion may be problematic. Some of these methods involve effecting an increase in hydrostatic pressure in the well bore so as to force the tar out of the well bore to the surface. However, this increased hydrostatic pressure may damage the well bore and/or a portion of the subterranean formation. Other conventional methods utilize treatment fluids that comprise dispersants, surfactants, and/or solubilizers, which allow the tar particles to dissolve in or homogenize with the treatment fluids. However, the tar particles may not be readily separated out of the fluid once they have dissolved into or homogenized with the fluid. The presence of the tar particles in the treatment fluid may alter its rheological properties and/or suspension capacity, which may limit its use in subsequent operations. Moreover, the addition of these dispersants, surfactants, and solubilizers may increase the complexity and cost of the drilling operation.

SUMMARY

The present invention relates to methods and compositions for use in subterranean operations. More particularly, the present invention relates to tar stabilizing polymers used to treat tar resident in a well bore and associated methods of use.

An embodiment of the present invention provides a method for treatment of well bore tar. The method may comprise contacting tar resident in a well bore with a tar stabilizing polymer comprising at least one polymer selected from the group consisting of a styrene polymer, an acrylate polymer, a styrene-acrylate polymer, and any combination thereof. The method may further comprise allowing the tar stabilizing polymer to interact with the tar to at least partially reduce the tendency of the tar to adhere to a surface.

Another embodiment of the present invention provides a method for treatment of well bore tar. The method may comprise using a drill bit to enlarge a well bore in a subterranean formation comprising tar. The method may further comprise circulating a drilling fluid past the drill bit to remove cuttings from the drill bit, wherein the drilling fluid comprises an aqueous fluid and a tar stabilizing polymer comprising at least one polymer selected from the group consisting of a styrene polymer, an acrylate polymer, a styrene-acrylate polymer, and any combination thereof.

Yet another embodiment of the present invention provides a treatment fluid. The treatment fluid may comprise an aqueous fluid. The treatment fluid may further comprise a tar stabilizing polymer comprising at least one polymer selected from the group consisting of a styrene polymer, an acrylate polymer, a styrene-acrylate polymer, and any combination thereof.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods and compositions for use in subterranean operations. More particularly, the present invention relates to tar stabilizing polymers used to treat tar resident in a well bore and associated methods of use. As used herein, the term "tar stabilizing polymer" refers to a polymer that can interact with tar resident in a well bore such that the tar becomes less tacky and/or less able to adhere to a surface. One of the many advantages of the present invention, many of which are not discussed or alluded to herein, is that tar treated by the compositions and methods disclosed herein may be substantially less tacky and/or less able to adhere to a surface. As a result, tar treated in this manner may be susceptible to screen separation from treatment fluids, drill cuttings, tar sands, and the like.

Embodiments of the present invention disclose tar stabilizing polymers comprising a styrene polymer, an acrylate polymer, a styrene-acrylate polymer, or any combination thereof. The suitable tar stabilizing polymers generally can be emulsified in an aqueous fluid in accordance with present embodiments. In some embodiments, the tar stabilizing polymers may be ionic or nonionic in nature. In certain embodiments, the tar stabilizing polymers may interact with the tar resident in a well bore such that the properties of the tar are altered. In certain embodiments, the tar stabilizing polymers may bind or coat the tar such that the tar becomes less sticky.

Examples of styrene polymers that may be suitable for use in embodiments of the present invention include, but are not limited to, styrene copolymers which include co-monomers of styrene or any derivative thereof. In some embodiments, the styrene polymer may be made by polymerizing styrene, which may be substituted or unsubstituted. The styrene may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof. Combinations of styrene polymers may also be suitable, in certain embodiments. In some embodiments, the styrene polymer may comprise styrene in an amount in a range of about 90% to about 100% by weight of the styrene polymer, about 95% to about 100% by weight of the styrene polymer, or about 99% to about 100% by weight of the styrene polymer. In one embodiment, the styrene polymer may consist of styrene. In some embodiments, the styrene polymer may be essentially free of acrylate and/or acrylic acid.

Examples of acrylate polymers that may be suitable for use in embodiments of the present invention include, but are not limited to, acrylate copolymers which include co-monomers of acrylate or any derivative thereof. The acrylate may be substituted with any number of different groups that will be evident to those of ordinary skill in the art, including without limitation chloro groups, bromo groups, fluoro groups, alkyl groups, alkoxy groups, alkenyl groups, alkynyl groups, aryl groups, and substituted versions thereof. In accordance with present embodiments, the acrylate may comprise two or more units individually selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, any derivative thereof. Combinations of acrylate polymers may also be suitable, in certain embodiments. In some embodiments, the acrylate polymer may be formed by polymerizing acrylic acid, which may be subsequently neutralized to form the acrylate copolymer. In some embodiments, the acrylate polymer may comprise acrylate in an amount in a range of about 90% to about 100% by weight of the acrylate polymer, about 95% to about 100% by weight of the acrylate polymer, or about 99% to about 100% by weight of the acrylate polymer. In one embodiment, the acrylate polymer may consist of acrylate. In some embodiments, the acrylate polymer may be essentially free of styrene.

Examples of styrene-acrylate polymers that may be suitable for use in embodiments of the present invention may include, but are not limited to, styrene-acrylate copolymers and mixed copolymers which include at least one unit comprising styrene, a substituted styrene, and any derivative thereof; and at least one comprising -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, or any derivative thereof. Combinations of suitable styrene-acrylate polymers may also be suitable, in certain embodiments.

In some embodiments, the tar stabilizing polymers may be provided in the form of a latex emulsion or a powder. For example, a latex emulsion may be used that comprises the tar stabilizing polymer. In some embodiments, the latex emulsion may be in the range from about 5% to about 60% active by weight. In some embodiments, the latex emulsion may have a pH in the range of about 2 to about 4. The latex emulsion may further comprise a surfactant. Generally, any surfactant that will emulsify and/or suspend the tar stabilizing polymers may be used in embodiments of the fluids of the present invention. In certain embodiments, it may be desirable to select a surfactant that will not emulsify the tar sought to be treated. In certain embodiments, the surfactants may be present in an amount sufficient to emulsify and/or suspend the tar stabilizing polymers. This amount may depend on, among other things, the type of surfactant used and the amount of tar stabilizing polymer to be emulsified and/or suspended. A person of ordinary skill in the art will recognize, with the benefit of this disclosure, the type and amount of surfactant that should be added for a particular application. In another embodiment, the tar stabilizing polymers may be provided in the form of a powder that can, for example, be dispersed in water. In some embodiments, the tar stabilizing polymer may have, for example, a particle size of less than about 1 micron, less than about 500 nanometers, or less than about 100 nanometers.

In accordance with present embodiments, one or more of the tar stabilizing polymers may be included in a treatment fluid as described herein. As used herein, the term "treatment fluid" refers to any fluid that may be used in a subterranean application in conjunction with a desired function and/or for a desired purpose. The term "treatment fluid" does not imply any particular action by the fluid or any component thereof. Treatment fluids may be used, for example, to drill, complete, work over, fracture, repair, or in any way prepare a well bore for recovery of materials residing in a subterranean formation penetrated by the well bore. Examples of treatment fluids include, but are not limited, cement compositions, drilling fluids, spacer fluids, and spotting fluids.

In some embodiments, at least one tar stabilizing polymer may be included in a treatment fluid in a quantity sufficient to treat the tar in the well bore. In certain embodiments, the concentration of the tar stabilizing polymer in the treatment fluid may be at least about 1% by volume of the fluid, and up to an amount such that the tar stabilizing polymer will precipitate out of the fluid. In certain embodiments, the concentration of tar stabilizing polymer in the treatment fluid may be in the range of from about 1% to about 70% by volume of the fluid. In certain embodiments, the concentration of tar stabilizing polymer in the treatment fluid may be in the range for from about 1% to about 10% by volume of the fluid. In certain embodiments, the tar stabilizing polymer may be added to the treatment fluid in the form of a latex-type emulsion or as dispersed particles. One of ordinary skill in the art, with the benefit of this disclosure, will be able to determine the appropriate concentration of the tar stabilizing polymer in the fluid for a particular application.

In some embodiments, the treatment fluid may further comprise an aqueous fluid. For example, the tar stabilizing polymer may be dispersed in the aqueous fluid to form the treatment fluid. In one embodiment, a latex emulsion comprising a tar stabilizing polymer may be dispersed in the aqueous fluid. In another embodiment, a powder comprising a tar stabilizing polymer may be dispersed in the aqueous fluid. The aqueous fluid utilized in the treatment fluids of the present invention may be fresh water, distilled water, or salt water (e.g., water containing one or more salts dissolved therein). In certain embodiments, the treatment fluid may be an aqueous-based fluid. Generally, the water can be from any source, provided that it does not contain compounds that undesirably affect other components of the treatment fluid.

In certain embodiments, the treatment fluids of the present invention may further comprise a viscosifier, for example, to aid in suspending the tar stabilizing polymer in the treatment fluid. Suitable viscosifying agents may include, but are not limited to, colloidal agents (e.g., clays such as bentonite, polymers, and guar gum), emulsion-forming agents, diatomaceous earth, biopolymers, synthetic polymers, chitosans, starches, gelatins, or mixtures thereof.

Other additives suitable for use in subterranean treatment fluids may also be added to embodiments of the treatment fluids. The treatment fluids of the present invention may comprise any such additional additives that do not undesirably interact with the tar stabilizing polymer or other components of the fluid. The treatment fluids used in methods of the present invention optionally may comprise any number of additional additives, including, but not limited to, salts, surfactants, fluid-loss-control additives, gases (e.g., nitrogen, carbon dioxide) surface-modifying agents, tackifying agents, foamers, corrosion inhibitors, scale inhibitors, catalysts, clay-control agents, biocides, friction reducers, antifoam agents, bridging agents, dispersants, flocculants, hydrogen sulfide scavengers, carbon dioxide scavengers, oxygen scavengers, lubricants, breakers, weighting agents (e.g., barite), relative-permeability modifiers, resins, particulate materials (e.g., proppant particulates), wetting agents, coating-enhancement agents, and the like. Weighting agents may be used, for example, in treatment fluids, such as, drilling fluids to provide a density sufficient to, for example, control formation pressures. One of ordinary skill in the art, with the benefit of this disclosure, will be able to determine which additional additives are appropriate for a particular application.

As will be appreciated by those of ordinary skill in the art, with the benefit of this disclosure, embodiments of the treatment fluids may be used in a variety of subterranean operations for treatment of tar resident in a well bore. By treatment of the tar with a tar stabilizing polymer, as described herein, the adhesiveness of the tar may be reduced, thus facilitating removal of the tar from a well bore or other surface, for example. In some embodiments, the present invention discloses a method comprising contacting tar resident in a well bore with a tar stabilizing polymer, and allowing the tar stabilizing polymer to interact with the tar to at least partially reduce the tendency of the tar to adhere to a surface. In this manner, the removal of the tar from the well bore or other surface may be facilitated. In one embodiment, a treatment fluid comprising the tar stabilizing polymer may be introduced into the well bore such that the tar stabilizing polymer contacts the tar. One of ordinary skill in the art, with the benefit of this disclosure, should be able to determine the appropriate amount of time to allow the tar stabilizing polymer to interact with the tar so as to at least partially reduce the adhesiveness of the tar. In certain embodiments, after the tar stabilizing polymer has been allowed to interact with the tar, the tar then may be removed from the well bore by any means practicable for the given application.

In some embodiments, a treatment fluid comprising a tar stabilizing polymer may be introduced into a well bore as a drilling fluid. For example, a drill bit may be used to enlarge the well bore, and the treatment fluid comprising the tar stabilizing polymer may be circulated in the well bore past the drill bit. In some embodiments, the drilling fluid may be passed down through the inside of a drill string, exiting at a distal end thereof (e.g., through the drill bit), and returned to the surface through an annulus between the drill string and a well bore wall. Among other things the circulating drilling fluid should lubricate the drill bit, carry drill cuttings to the surface, and/or balance formation pressure exerted on the well bore. In certain embodiments, the drilling fluid may have a density in the range of from about 7.5 pounds per gallon ("lb/gal") to about 18 lb/gal, and alternatively from about 12 lb/gal to about 18 lb/gal.

In some embodiments, tar may be encountered in the course of drilling the well bore. The zones of the well bore may be intentionally or unintentionally contacted during the course of drilling. For example, embodiments may include drilling through zones of the well bore that contain tar sands. The term "tar sands" does not imply or require any specific amount of tar to be present. In some embodiments, one or more generally horizontal well bores may be drilled through the tar sands. In accordance with present embodiments, a tar stabilizing polymer may be included in the drilling fluid as the well bore is drilled in these tar-containing zones. In this manner, the tar stabilizing polymer contained in the treatment fluid may modify at least a portion of tar such that is becomes less tacky, making it less likely to stick to drill strings and other tubulars used in drilling operations. Tar modified in this way may yield tar cuttings that can be removed more effectively from the well bore. Additionally, tar that is drilled through may be less likely to flow into the well bore or the subterranean formation as the plastic properties of the tar may be altered. Similarly, the treated tar that forms about the surface of the well bore may act to stabilize the well bore. In addition, tar treated with the tar stabilizing polymers may be separated from a treatment fluid by passing the fluid through a screen or similar separation apparatus.

In some embodiments, a treatment fluid comprising a tar stabilizing polymer may be introduced into a well bore as a pill for spot treatment, wherein the treatment fluid is introduced into the well bore to interact with tar in a specific portion of the well bore. In some embodiments, the pill may be introduced into a zone of the well bore that contains tar sands. The pill should enter the well bore and interact with tar resident in the well bore, thus modifying at least a portion of the tar such that is become less tacky. In certain embodiments of this type, the tar stabilizing polymer may be allowed to interact with the tar resident in the well bore for at least a time sufficient to at least partially reduce the adhesiveness of the tar. In some embodiments, this may be more than about one hour. In others, more time will be required to at least partially reduce the adhesiveness of the tar, depending upon, among other factors, the temperature inside the well bore and the amount of tar in the portion of the well bore being treated. One of ordinary skill in the art, with the benefit of this disclosure, will be able to determine the appropriate amount of time to allow the tar stabilizing polymer to interact with the tar. In certain embodiments, after the tar stabilizing polymer has been allowed to interact with the tar, the tar then may be removed from the well bore by any means practicable for the given application. In some embodiments, the pill may be used ahead of and/or behind a non-aqueous drilling fluid, which may comprise any number of organic liquids, including, but are not limited to, mineral oils, synthetic oils, esters, paraffin oils, diesel oil, and the like.

In some embodiments, the amount of the tar stabilizing polymer present in the treatment fluid may be monitored while the tar stabilizing polymer is circulated in the well bore. For example, once a unit of tar stabilizing polymer in a treatment fluid is allowed to interact with a unit of tar in a well bore, that unit of the tar stabilizing polymer may be depleted from the treatment fluid and thus unable to interact with additional tar. For this reason, it may be desirable to monitor the concentration of the tar stabilizing polymer in the treatment fluid to determine if more should be added. In some embodiments, the tar stabilizing polymer may be added to the treatment fluid before the treatment fluid is introduced into the well bore, for example, a batch-mixing process. In some embodiments, it may be desirable to continue to add the tar stabilizing polymer to the treatment fluid (e.g., "on-the-fly" mixing) according to the monitored concentration of the tar stabilizing polymer in the treatment fluid. In some embodiments, the concentration of tar stabilizing polymer in the treatment fluid may be monitored by direct measurement. In some embodiments, the concentration of tar stabilizing polymer in the treatment fluid may be monitored indirectly by measuring the depletion of the tar stabilizing polymer from the treatment fluid. The concentration of the tar stabilizing polymer in the treatment fluid may be monitored, for example, by analytical polymer spectroscopy, chromatography, gravimetry, and quantitative precipitation.

To facilitate a better understanding of the present invention, the following examples of specific embodiments are given. In no way should the following examples be read to limit or define the entire scope of the invention.

Example 1

An aqueous-base fluid was formulated as shown in Table 1.

TABLE 1

| Base Fluid 1 | |
|---|---|
| Fresh Water (lb/bbl) | 345.8 |
| Xanthan Gum (lb/bbl) | 0.701 |
| Starch (lb/bbl) | 4.206 |
| Cellulose (lb/bbl) | 0.701 |
| Caustic Soda (lb/bbl) | 0.05 |

A nonaqueous-base fluid was also formulated as shown in Table 2.

TABLE 2

| Base Fluid 2 | |
|---|---|
| Synthetic Base Oil (lb/bbl) | 131.45 |
| Fatty Acid Emulsifier (lb/bbl) | 10 |
| Freshwater (lb/bbl) | 84.12 |
| Lime (lb/bbl) | 1 |
| Polymeric Filtration Agent (lb/bbl) | 2 |
| Barium Sulfate (lb/bbl) | 188.96 |
| Calcium Carbonate (lb/bbl) | 15 |
| Calcium Chloride (lb/bbl) | 29.09 |
| Simulated Drill Solids (lb/bbl) | 20 |
| Rheology Modifier (lb/bbl) | 1 |

A 50 g sample of tar sand (25% tar by mass) was placed in a first ½ lab barrel along with 133.1 g of Base Fluid 1 and a steel test rod. A 12.5 g sample of tar was placed in a second ½ lab barrel along with 216.9 g of Base Fluid 2 and a steel test rod. The barrels were then hot rolled for 16 hours at 150° F. (approx. 66.7° C.) under 200 psi in a rolling cell, and the test rods were visually inspected for tar accretion. Base Fluid 1 was contaminated with tar sand, and tar was accreted on the test rod. Base Fluid 2 was contaminated with tar, and tar was accreted on the test rod.

Example 2

The two fluid samples were prepared as set forth in Table 3 using Base Fluid 1 described in Table 1. The fluid samples are designated Sample A and B in the table below. The styrene-acrylate polymers used in this example were obtained as an emulsion and used as received. Baracor 700™ corrosion inhibitor is an anti-corrosion additive commercially available from Halliburton Energy Services, Houston, Tex. After hot rolling for 16 hours at 150° F. (approx. 66.7° C.) under 200 psi in a rolling cell, the mass of the test rod was determined both with any accreted tar and after the accreted tar had been cleaned off. These masses and the mass of the accreted tar for each sample is reported in Table 3.

TABLE 3

| Sample | A | B |
|---|---|---|
| Base Fluid 1 (g) | 133.1 | 150.6 |
| Styrene-Acrylate Emulsion (g) | 15 | 15 |
| Baracor 700 ™ Corrosion Inhibitor (ml) | 0.75 | 0.75 |
| Tar Sand (g) | 50 | — |
| Tar (g) | — | 12.5 |
| Post Accretion Test Rod Mass (g) | 337.45 | 337.16 |
| Post Cleaning Test Rod Mass (g) | 337.25 | 336.93 |
| Mass of accreted tar (g) | 0.20 | 0.23 |
| Observations | Tar not sticking to cell wall. Rod is clean. Tar is firm, not sticky. Sand is separated from tar and settled on bottom of cell. Fluid not contaminated. | Tar form small flocs. Tar not on cell wall. Rod has loosely adhered flocs that can be easily brushed away. Tar is pliable but not sticky. |

Example 3

In this example, tar was screened from tar-containing fluids. Base fluid 1 was combined with tar sand and, in two cases, a treatment additive, as illustrated in Table 4 below. The tar-containing fluids were hot rolled then poured across a vibrating screen material to assess potential screen clogging properties. A screen may be considered fouled if the tar is adhesive and begins to seal/clog the screen openings thereby preventing a fluid from effectively draining. Sample C was a baseline reference of nontreated, adhesive tar and yielded adhesive screen fouling. Sample D was an unsuccessful treatment with a sodium salt that also yielded adhesive screen fouling. Sample E was a chemical treatment of tar with styrene-acrylate polymers that yielded a non-adhesive tar and minimized screen fouling. The styrene-acrylate polymers used in this example (E) were the same as in the previous tests.

TABLE 4

| Sample | C | D | E |
|---|---|---|---|
| Base Fluid 1 (g) | 149.8 | 149.8 | 149.8 |
| Sodium Salt (g) | — | 26.25 | — |
| Styrene acrylate emulsion (g) | — | — | 15 |
| Baracor 700 ™ Corrosion Inhibitor (ml) | — | — | 0.75 |
| Tar Sand (g) | 50 | 50 | 50 |

Example 4

In this example, another aqueous-base fluid was formulated as shown in Table 5. This aqueous-base fluid is referred to in Table 5 as Base Fluid 3.

TABLE 5

Base Fluid 3

| Fresh Water (bbl) | 0.976 |
| --- | --- |
| | (341.8 ml) |
| Xanthan Gum (lb) | 0.877 |
| Starch (lb) | 5.261 |
| Caustic Soda (lb) | 0.035 |
| Bridging Agent (lb) | 8.768 |
| Simulated Drill Solids (lb) | 1.754 |

Fluid samples were prepared by adding a styrene copolymer to Base Fluid 3 in different quantities to determine its effect on well bore tar, as set forth in Table 6 below. The fluid samples are designated Samples F and G in the table below. The styrene copolymer was obtained as a latex emulsion (approx. 45 wt % active) and used as received. Baracor 700™ corrosion inhibitor, available from Halliburton Energy Services, Inc., was also added to the fluid samples, as indicated in the table below. Tar sands with approximately 80% sands and 20% bitumen by weight were used for this test. A steel rod was used to mimic the drill strings interaction with the tar sands. For each test, the tar sands were placed in a lab barrel together with the respective fluid sample and the steel rod. The system was then aged by rolling at approximately 77° F. (approx. 25° C.) for 16 hours in a rolling cell. The mass of the steel rod was determined prior to testing without any accreted tar and after testing with accreted tar. The mass of the rod was also measured after rinsing under a stream of water. These masses and the mass of the accreted tar for each sample are reported in the table below.

TABLE 6

| Sample | F | G |
| --- | --- | --- |
| Base Fluid 3 (ml) | 120 | 120 |
| Styrene Latex Emulsion (lb/bbl) | 10 | 30 |
| Baracor 700 ™ Corrosion Inhibitor (lb/bbl) | 6 | 6 |
| Tar Sands (lb/bbl) | 85 | 85 |
| Pre-Accretion Test Rod Mass (g) | 338.53 | 340.40 |
| Post-Accretion Rod Mass (g) | 341.75 (338.61 after rinsing) | 343.42 (341.47 after rinsing) |
| Mass of accreted tar (g) | 3.22 (0.08 after rinsing) | 3.02 (1.07 after rinsing) |
| Observations | Some tar stuck to bar but came off very easily under a slow stream of water. Tar was only very slightly sticky, but not as bad as untreated tar. Fluid was not contaminated. Tar was far less adhesive and easily disposed of. | Some tar stuck to bar but almost all came off very easily under a slow stream of water; however, not all. Tar was stuck to the inside of the cell, but it also came off under a stream of water. Fluid was not contaminated. Tar was far less adhesive and easily disposed of. |

As set forth in the table above, the tar sands were treated with the styrene copolymer with the tar becoming non-adhesive in nature. Some of the tar was loosely adhered to the steel rod but was only mechanically pressed to the rod as it slid off very easily upon application of a stream of water, revealing the tar's non-adhesive nature.

Example 5

In this example, two additional fluid samples were prepared by adding an acrylate copolymer to Base Fluid 3 in different quantities to determine its effect on well bore tar, as set forth in Table 7. The fluid samples are designated Samples H and I in the table below. The acrylate copolymer was obtained as a latex emulsion (approx. 45 wt % active) and used as received. Baracor 700™ corrosion inhibitor, available from Halliburton Energy Services, Inc., was also added to the fluid samples, as indicated in the table below. Tar sands with approximately 80% sands and 20% bitumen by weight were used for this test. A steel rod was used to mimic the drill strings interaction with the tar sands. For each test, the tar sands were placed in a lab barrel together with the respective fluid sample and the steel rod. The system was then aged by rolling at approximately 77° F. (approx. 25° C.) for 16 hours in a rolling cell. The mass of the steel rod was determined prior to testing without any accreted tar and after testing with accreted tar. The mass of the rod was also measured after rinsing under a stream of water. These masses and the mass of the accreted tar for each sample are reported in the table below.

TABLE 7

| Sample | H | I |
| --- | --- | --- |
| Base Fluid 3 (ml) | 120 | 120 |
| Styrene Latex Emulsion (lb/bbl) | 10 | 30 |
| Baracor 700 ™ Corrosion Inhibitor (lb/bbl) | 6 | 6 |
| Tar Sands (lb/bbl) | 85 | 85 |
| Pre-Accretion Test Rod Mass (g) | 335.07 | 334.60 |
| Post-Accretion Rod Mass (g) | 336.40 (335.07 after rinsing) | 343.42 (334.80 after rinsing) |
| Mass of accreted tar (g) | 1.33 (0.0 after rinsing) | 8.82 (0.20 after rinsing) |
| Observations | Some tar was mechanically pressed to the bar but came off extremely easily under a slow stream of water. Tar was not sticky. Tar was also found sunken in the fluid that was not sticky at all. Fluid was not contaminated. | Tar was mechanically pressed to bar but came off extremely easily under a slow stream of water. Tar was only slightly sticky, but far less so than untreated samples. Fluid was not contaminated. |

While compositions and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "about a to about b," or, equivalently, "from approximately a to b," or, equivalently, "from approximately a-b") disclosed herein is to be understood to set forth every number and range encompassed within the broader range of values. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

What is claimed is:

1. A method for treatment of well bore tar comprising:
   contacting tar resident in a well bore with an aqueous-based treatment fluid comprising a tar stabilizing polymer comprising a copolymer of styrene co-monomers wherein the copolymer of styrene co-monomers comprises the styrene co-monomers in an amount in the range of about 99% to about 100% by weight, wherein the copolymer of styrene co-monomers is essentially free of acrylate and acrylic acid, and wherein the tar stabilizing polymer is dispersed in the aqueous-based treatment fluid as a latex emulsion or a powder; and
   allowing the aqueous-based treatment fluid to interact with the tar to at least partially reduce the tendency of the tar to adhere to a surface; and
   after the aqueous-based treatment fluid has interacted with the tar, the tar is removed from the well bore by filtering the tar from the aqueous-based treatment fluid.

2. The method of claim 1, further comprising dispersing at least a latex emulsion comprising the tar stabilizing polymer in an aqueous fluid to form the aqueous-based treatment fluid, and introducing the aqueous-based treatment fluid into the well bore.

3. The method of claim 1, further comprising dispersing the tar stabilizing polymer as a powder in an aqueous fluid to form the aqueous-based treatment fluid; and introducing the aqueous-based treatment fluid into the well bore.

4. The method of claim 1, wherein the tar stabilizing polymer is present in the aqueous-based treatment fluid in an amount of about 1% to about 70% by volume of the aqueous-based treatment fluid.

5. The method of claim 1, wherein the tar stabilizing polymer is present in the aqueous-based treatment fluid in an amount of about 1% to about 10% by volume of the aqueous-based treatment fluid.

6. The method of claim 1, wherein the aqueous-based treatment fluid further comprises a viscosifying agent selected from the group consisting of a colloidal agent, a clay, a polymer, guar gum, an emulsion-forming agent, diatomaceous earth, a biopolymer, a synthetic polymer, chitosan, a starch, a gelatin, and any mixture thereof.

7. The method of claim 1, wherein the aqueous-based treatment fluid further comprises at least one additive selected from the group consisting of a salt, a surfactant, a fluid-loss-control additive, a gas, nitrogen, carbon dioxide, a surface-modifying agent, a tackifying agent, a foamer, a corrosion inhibitor, a scale inhibitor, a catalyst, a clay-control agent, a biocide, a friction reducer, an antifoam agent, a bridging agent, a dispersant, a flocculant, hydrogen sulfide scavenger, carbon dioxide scavenger, an oxygen scavenger, a lubricant, a viscosifier, a breaker, a weighting agent, barite, a relative-permeability modifier, a resin, a particulate material, a proppant particulate, a wetting agent, a coating-enhancement agent, and any combination thereof.

8. The method of claim 1, wherein the method further comprises circulating the aqueous-based treatment fluid past a drill bit to remove drill cuttings from the drill bit.

9. The method of claim 1, wherein the method further comprises introducing the aqueous-based treatment fluid into the well bore as a pill for a spot treatment of the well bore tar.

10. The method of claim 1, further comprising monitoring the concentration of the tar stabilizing polymer in the aqueous-based treatment fluid.

11. The method of claim 1, wherein the tar stabilizing polymer is introduced into a zone of the well bore comprising tar sands.

12. The method of claim 1 wherein the copolymer of styrene co-monomers is substituted with at least one group selected from the group consisting of a chloro group, a bromo group, a fluoro group, an alkyl group, an alkoxy group, an alkenyl group, an alkynyl group, an aryl group, and substituted versions thereof.

13. A method for treatment of well bore tar comprising:
    contacting tar resident in a well bore with a treatment fluid comprising a tar stabilizing polymer comprising at least one polymer selected from the group consisting of a styrene polymer, an acrylate polymer, a styrene-acrylate polymer, and any combination thereof; and
    allowing the treatment fluid to interact with the tar to at least partially reduce the tendency of the tar to adhere to a surface; and
    after the treatment fluid has interacted with the tar, the tar is removed from the well bore by filtering the tar from the treatment fluid.

14. The method of claim 13, wherein the tar is removed by passing the treatment fluid through a screen or similar separation apparatus.

15. The method of claim 13, wherein the treatment fluid comprises the styrene polymer, and wherein the styrene copolymer comprises styrene in an amount in the range of about 90% to about 100% by weight.

16. The method of claim 13, wherein the treatment fluid comprises the acrylate polymer, and wherein the acrylate copolymer comprises acrylate in an amount in the range of about 90% to about 100% by weight.

17. The method of claim 13, wherein the treatment fluid comprises the acrylate polymer, wherein the acrylate polymer comprises a copolymer of acrylate co-monomers comprising two or more units individually selected from the group consisting of -acrylate, -methacrylate, -ethylacrylate, -propylacrylate, -butylacrylate, -tert-butyl-acrylate, -n-hydroxyethyl methacrylate, -potassium acrylate, -pentabromobenzyl acrylate, -methyl methacrylate, -ethyl methacrylate, -n-nitrophenyl acrylate, -methyl 2-(acyloxymethyl)acrylate, -cyclohexyl acrylate, -n-ethylhexyl acrylate, any derivative thereof, and any combination thereof.

18. The method of claim 13, wherein the treatment fluid further comprises a viscosifying agent selected from the group consisting of a colloidal agent, a clay, a polymer, guar gum, an emulsion-forming agent, diatomaceous earth, a biopolymer, a synthetic polymer, chitosan, a starch, a gelatin, and any mixture thereof.

19. The method of claim 13, wherein the treatment fluid further comprises at least one additive selected from the group consisting of a salt, a surfactant, a fluid-loss-control additive, a gas, nitrogen, carbon dioxide, a surface-modifying agent, a tackifying agent, a foamer, a corrosion inhibitor, a scale inhibitor, a catalyst, a clay-control agent, a biocide, a friction reducer, an antifoam agent, a bridging agent, a dispersant, a flocculant, hydrogen sulfide scavenger, carbon dioxide scavenger, an oxygen scavenger, a lubricant, a viscosifier, a breaker, a weighting agent, barite, a relative-permeability modifier, a resin, a particulate material, a proppant particulate, a wetting agent, a coating-enhancement agent, and any combination thereof.

20. The method of claim 13, wherein the method further comprises introducing the treatment fluid into the well bore as a pill for a spot treatment of the well bore tar.

21. The method of claim 13, wherein the tar stabilizing polymer is introduced into a zone of the well bore comprising tar sands.

22. The method of claim 13, and wherein the method further comprises circulating the treatment fluid past a drill bit to remove drill cuttings from the drill bit.

23. A method for treatment of well bore tar comprising:
contacting tar resident in a well bore with an aqueous-based treatment fluid comprising a tar stabilizing polymer comprising at least one polymer selected from the group consisting of (i) a non-ionic copolymer of acrylate co-monomers, wherein the copolymer of acrylate co-monomers comprises the acrylate co-monomers in an amount of about 99% to about 100% by weight, and wherein the copolymer of acrylate co-monomers is essentially free of styrene, and (ii) a copolymer of acrylic acid formed by polymerizing acrylic acid, wherein the tar stabilizing polymer is dispersed in the aqueous-based treatment fluid as a latex emulsion or a powder; and
allowing the aqueous-based treatment fluid to interact with the tar to at least partially reduce the tendency of the tar to adhere to a surface; and
after the aqueous-based treatment fluid has interacted with the tar, the tar is removed from the well bore by filtering the tar from the aqueous-based treatment fluid.

24. The method of claim 23, wherein the copolymer of acrylate co-monomers comprises two or more units individually selected from the group consisting of -acrylate, -methacrylate, -ethyl acrylate, -propylacrylate, -butylacrylate, -tert-butyl-acrylate, -n-hydroxyethyl methacrylate, pentabromobenzyl acrylate, -methyl methacrylate, -ethyl methacrylate, -n-nitrophenyl acrylate, -methyl 2-(acyloxymethyl) acrylate, -cyclohexyl acrylate, -n-ethylhexyl acrylate, any derivative thereof, and any combination thereof.

25. The method of claim 23, further comprising dispersing at least a latex emulsion comprising the tar stabilizing polymer in an aqueous fluid to form the aqueous-based treatment fluid, and introducing the aqueous-based treatment fluid into the well bore.

26. The method of claim 23, further comprising dispersing the tar stabilizing polymer as a powder in an aqueous fluid to form the aqueous-based treatment fluid; and introducing the aqueous-based treatment fluid into the well bore.

27. The method of claim 23, wherein the tar stabilizing polymer is present in the aqueous-based treatment fluid in an amount of about 1% to about 70% by volume of the aqueous-based treatment fluid.

28. The method of claim 23, wherein the tar stabilizing polymer is present in the aqueous-based treatment fluid in an amount of about 1% to about 10% by volume of the aqueous-based treatment fluid.

29. The method of claim 23, wherein the aqueous-based treatment fluid further comprises a viscosifying agent selected from the group consisting of a colloidal agent, a clay, a polymer, guar gum, an emulsion-foi ming agent, diatomaceous earth, a biopolymer, a synthetic polymer, chitosan, a starch, a gelatin, and any mixture thereof.

30. The method of claim 23, wherein the aqueous-based treatment fluid further comprises at least one additive selected from the group consisting of a salt, a surfactant, a fluid-loss-control additive, a gas, nitrogen, carbon dioxide, a surface-modifying agent, a tackifying agent, a foamer, a corrosion inhibitor, a scale inhibitor, a catalyst, a clay-control agent, a biocide, a friction reducer, an antifoam agent, a bridging agent, a dispersant, a flocculant, hydrogen sulfide scavenger, carbon dioxide scavenger, an oxygen scavenger, a lubricant, a viscosifier, a breaker, a weighting agent, barite, a relative-permeability modifier, a resin, a particulate material, a proppant particulate, a wetting agent, a coating-enhancement agent, and any combination thereof.

31. The method of claim 23, and wherein the method further comprises circulating the aqueous-based treatment fluid past a drill bit to remove drill cuttings from the drill bit.

32. The method of claim 23, wherein the method further comprises introducing the aqueous-based treatment fluid into the well bore as a pill for a spot treatment of the well bore tar.

33. The method of claim 23, further comprising monitoring the concentration of the tar stabilizing polymer in the aqueous-based treatment fluid.

34. The method of claim 23, wherein the tar stabilizing polymer is introduced into a zone of the well bore comprising tar sands.

35. The method of claim 23 wherein the copolymer of acrylate co-monomers is substituted with at least one group selected from the group consisting a chloro group, a bromo group, a fluoro group, an alkyl group, an alkoxy group, an alkenyl group, an alkynyl group, an aryl group, and substituted versions thereof.

* * * * *